Feb. 6, 1923.
S. B. CLAY.
NUT TAPPING MACHINE.
FILED SEPT. 4, 1920.
1,444,110.
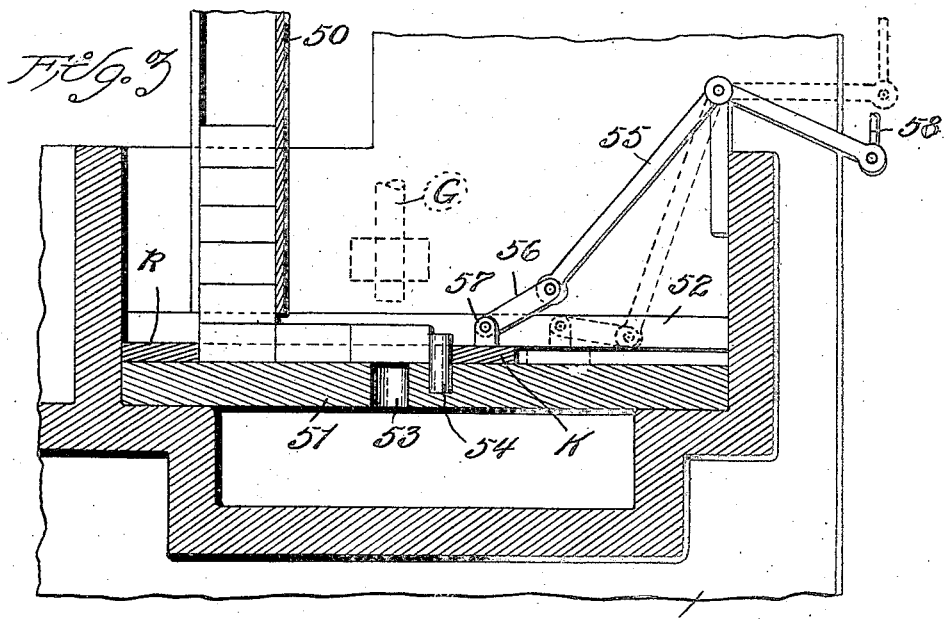
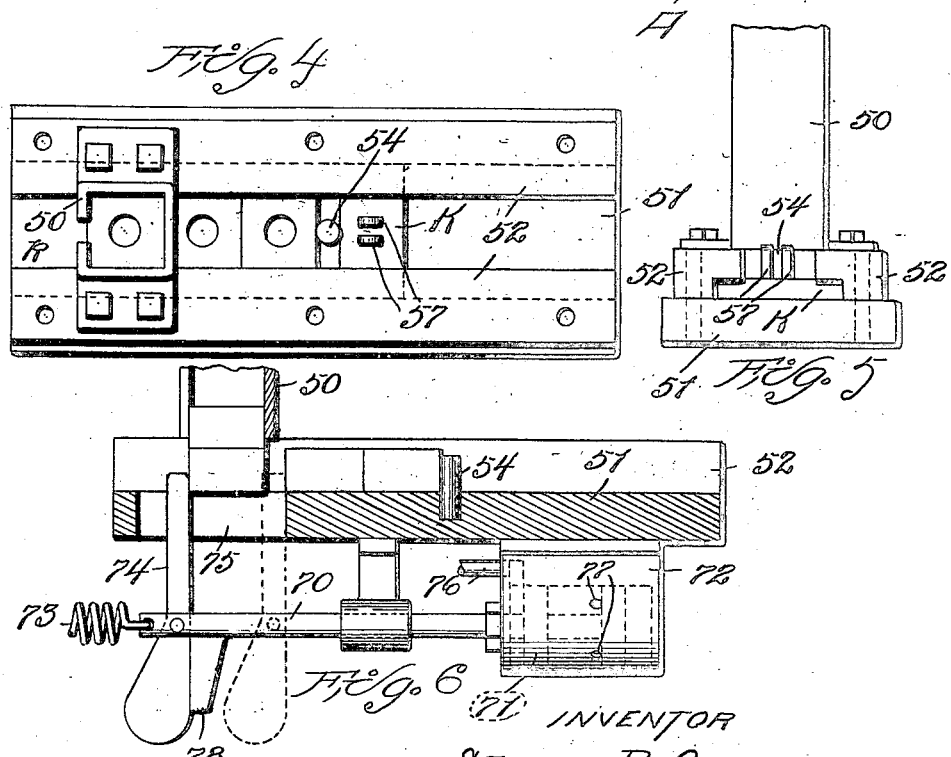
INVENTOR
SAMUEL B. CLAY,
by Bakewell Church ATTORNEYS.

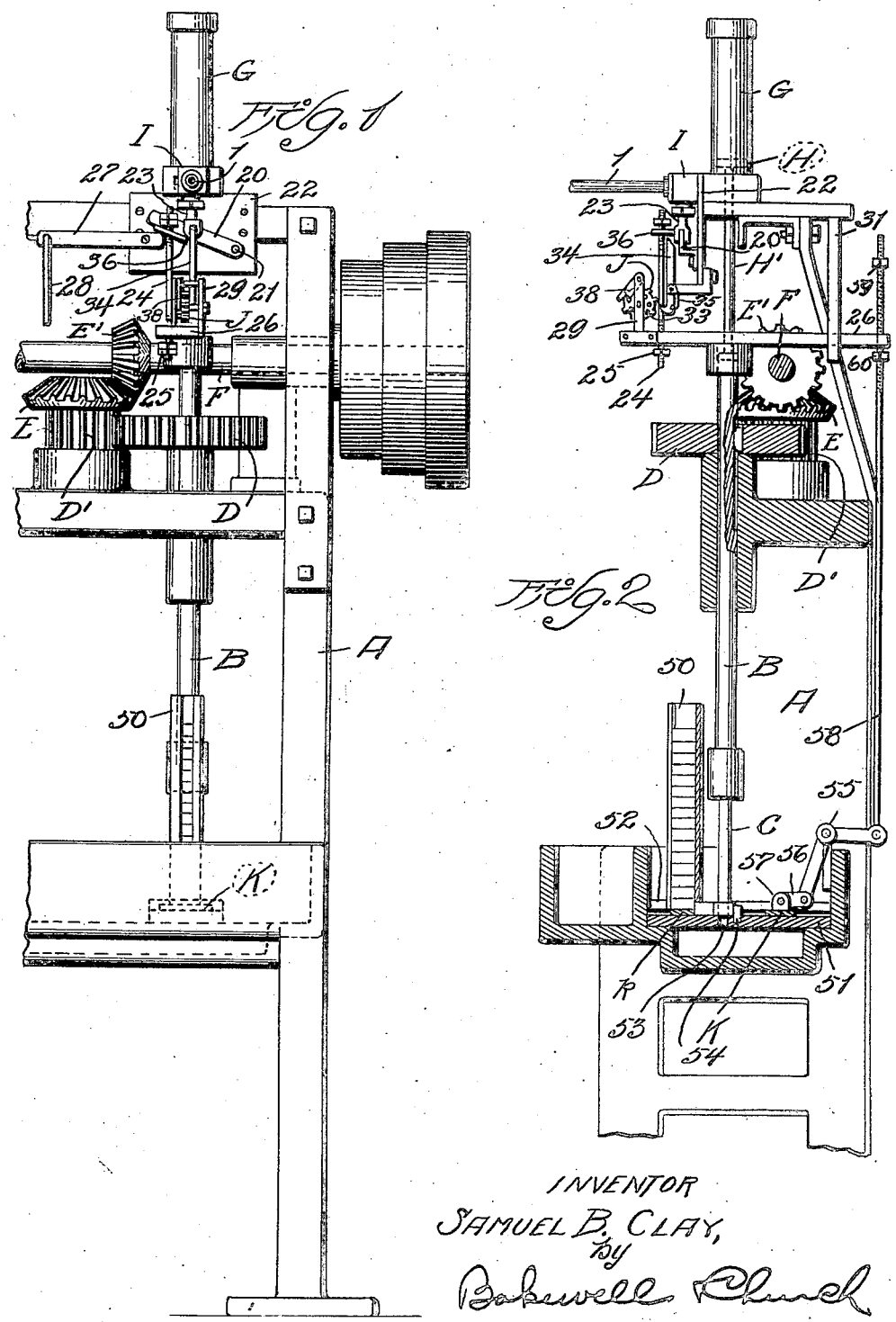

Patented Feb. 6, 1923.

1,444,110

UNITED STATES PATENT OFFICE.

SAMUEL B. CLAY, OF ST. LOUIS, MISSOURI, ASSIGNOR OF ONE-HALF TO EDWARD R. FISH, OF WEBSTER GROVES, MISSOURI.

NUT-TAPPING MACHINE.

Application filed September 4, 1920. Serial No. 408,254.

*To all whom it may concern:*

Be it known that I, SAMUEL B. CLAY, a citizen of the United States, residing at St. Louis, Missouri, have invented a certain new and useful Improvement in Nut-Tapping Machines, of which the following is a full, clear, and exact description, such as will enable others, skilled in the art to which it appertains, to make and use the same.

This invention relates to nut tapping machines, and has for its main object to provide an efficient nut tapping machine of simple construction that will automatically feed nut blanks into position to be operated on, tap or thread a number of nut blanks and then cease operating.

Another object is to provide a nut blank feeding mechanism of simple design that can be used in conjunction with a nut tapping machine for automatically feeding nut blanks from a supply hopper into position to be acted upon by the tap or threading device of the machine. Other objects and desirable features of my invention will be hereinafter pointed out.

Figure 1 of the drawings is a front elevational view of a portion of a nut tapping machine constructed in accordance with my invention.

Figure 2 is a vertical sectional view of the machine shown in Figure 1.

Figure 3 is an enlarged vertical sectional view illustrating the operation of the nut blank feeding mechanism.

Figure 4 is a top plan view of the nut blank supply hopper and the reciprocating slide that feeds the nut blanks from said hopper into position to be acted upon by the tap carried by the spindle of the machine.

Figure 5 is a front elevational view of the nut blank hopper; and

Figure 6 is a vertical sectional view illustrating a modification of my invention.

Referring to the drawings which illustrate the preferred form of my invention, A designates the frame or supporting structure of a multiple spindle nut tapping machine. B designates one of the vertically movable spindles of said machine which is provided with a tap or threading device C for cutting screw threads in the nut blanks. D designates a gear splined to said spindle and meshing with a gear D' that is rotated by a bevel pinion E which meshes with a bevel pinion E' on the operating shaft F, and G designates a cylinder mounted on the frame of the machine above the spindle B and provided with a piston H whose rod H' is operatively connected with the upper end of the spindle B. Any other suitable means than the gears above referred to can be used for rotating the spindle B.

The machine herein illustrated is provided with a mechanism similar to that described in my pending application for patent for nut tapping machines, Serial No. 375,075, filed April 19, 1920, for raising and lowering the spindle B, said mechanism being so constructed that after it has been set in operation the spindle B will move upwardly and downwardly a number of times and then cease operating automatically, thus causing a number of nut blanks to be tapped automatically without requiring the operator to actuate a controlling device at each cycle of the machine. I wish it to be understood, however, that it is immaterial, so far as my present invention is concerned, whether the mechanism that governs the operation of the spindle B is so constructed that said spindle will merely move downwardly and upwardly once and then cease operating, or will move downwardly and upwardly a number of times and then cease operating.

A fluid medium such as compressed air is used to raise the spindle B and hold said spindle in its elevated position, and gravity is relied upon to move said spindle downwardly so as to feed the tap C through the nut blank. Said fluid medium is supplied to the cylinder G through a pipe 1 and the admission and exhaust of said fluid medium to and from said cylinder is governed by an ordinary D shaped slide valve that is moved automatically in one direction at the completion of the threading operation so as to admit the operating medium to the lower end of the cylinder G, thus causing the spindle B to move upwardly, and is moved automatically in the opposite direction at the end of the upward stroke of said spindle so as to permit the operating medium to exhaust from said cylinder and thus permit the spindle to move downwardly by gravity. The valve just referred to is arranged in a cage or housing I and the actuating mechanism for said valve is of the construction described in my pending application previously referred to and comprises a lever 20 pivotally connected at 21 to a supporting plate 22 and pivotally connected intermediate its ends to the stem 23 of the controlling valve. A rod 24 that projects downwardly from the valve lever 20 is provided with a stop 25 that co-operates with a part 26 which moves vertically with the spindle B so as to open the controlling valve and thus admit the operating medium to the lower end of the cylinder G at the end of the downward stroke of the spindle B. Said controlling valve is moved in the opposite direction at the end of the upward stroke of the spindle B, so as to permit the operating medium to escape from the cylinder G by means of a toothed wheel J that moves vertically with the spindle B and which is so arranged that one of the teeth on same will engage a forwardly-projecting lip 36 on the valve lever 20 and move said lever at the completion of the upward stroke of the spindle B. In addition to the automatic actuating mechanism for the controlling valve, a manually-operable means is provided for moving the valve lever 20 in a direction to cause the operating medium to exhaust from the cylinder G, said manually-operable means consisting of a pivotally-mounted lever 27 on the stationary supporting plate 22 provided with an operating rod 28 and arranged so that the free end of said lever 27 will engage the free end of the valve lever 20 and move said lever when the operating rod 28 is pulled downwardly.

The toothed wheel J is rotatably mounted between a pair of uprights 29 on the part 26 previously referred to, said part consisting of a member connected to the piston rod H' in such a manner that it will move vertically with same and having its rear end portion guided in a vertically-disposed guideway 31 which projects downwardly from the portion of the frame A of the machine on which the cylinder G is mounted. The wheel J is provided with a plurality of teeth, the number of which will vary according to the number of automatic operations it is desired to have the spindle B make. For example, if it is desired to have the spindle make ten operations and then come to rest automatically, the wheel J will be provided with nine teeth and a blank space arranged between the first tooth and the last tooth on the periphery of the wheel. The function of the teeth on the wheel J is to move the valve lever 20 upwardly at the completion of each upward stroke of the spindle B, so as to exhaust the operating medium from the cylinder G, and thus permit the spindle B to move downwardly by gravity. In order that the machine will make a definite number of complete operations and then come to rest automatically, means is provided for turning the wheel J one step forwardly at each cycle of the spindle B, so as to bring the blank space on the wheel J into such a position with relation to the forwardly-projecting lip 36 on the valve lever 20 that said lever will not be moved upwardly or in direction to exhaust the operating medium from the cylinder at the completion of the last upward stroke of the spindle. In view of the fact that the mechanism above described for actuating the controlling valve is clearly illustrated and described in my pending application previously referred to, I have not herein illustrated the details of construction of the means for progressively moving the wheel J one step forwardly at each cycle of the spindle B. Suffice it to say that said means consists of a pivotally-mounted dog 34 (see Figure 2) arranged in such a manner that on the downward stroke of the spindle B said dog will cause the wheel J to turn one step forwardly. Retrograde movement of the wheel J is prevented by a pawl 38 carried by one of the uprights 29 on which the wheel J is mounted (as shown in Figure 2). When the wheel J reaches such a position that the blank space on the periphery of said wheel is brought into operative relationship with the forwardly-projecting lip 36 on the valve lever 20, the machine will cease operating automatically at the end of the upward stroke of the spindle B.

The machine herein illustrated differs from the machine described in my application previously referred to, in that it is provided with a mechanism for automatically feeding nut blanks into position to be acted upon by the tap C on the spindle B. Said feeding mechanism comprises a nut blank hopper 50 arranged vertically or in an inclined position in vertical alignment with the spindle B in front of same, and means for causing nut blanks to be fed progressively from the lower end of the hopper 50 into vertical alignment with the tap C on the spindle. In the form of my invention shown in Figures 1 to 5, inclusive, a reciprocating slide K is mounted on a horizontally-disposed supporting plate 51 at the lower end of the hopper 50, and a mechanism operated by the vertical movement of the spindle B is employed for reciprocating said slide forwardly and rearwardly so as to effect the feeding of the nut blanks from the lower end of the hopper 50 into alignment with the tap C. The slide K is mounted in a guideway on the supporting plate 51 formed by members 52 that lap over the longitudinal side edge portions of said slide, and said slide is provided with a slot or opening for receiving nut blanks that rest upon the supporting plate 51. In other words, the slide K consists practically of an open frame that surrounds a number of nut blanks that rest upon the supporting plate 51. The supporting plate 51 is provided with a hole 53 through which the tap C on the spindle passes during the threading operation, and a stop 54 is mounted in the plate 51 in proximity to the hole 53, so as to govern the position of the nut blank that is in operative position, or, in other words, in a position to be acted upon by the tap C on the spindle. The slot in the slide K previously referred to is long enough to receive three nut blanks and the stop 54 when said slide is in its extreme forward position, as shown in Figure 3, the lowermost nut blank in the hopper 50 then being supported by the supporting plate 51 of the machine. When the slide K is an its extreme rearward position, as shown in Figure 2, the lowermost nut blank in the hopper rests upon the front end portion R of the slide and the slot in said slide then holds only two nut blanks.

The mechanism for actuating the slide K consists of a bell crank lever 55 having its vertical arm connected by means of a link 56 to a pair of upwardly-projecting lugs 57 on the slide and having its horizontal arm pivotally connected to the lower end of a rod 58 whose upper end portion projects vertically through a hole in the member 26 previously referred to that moves vertically with the spindle, said rod 58 being provided with two stops 59 and 60 arranged above and below the member 26.

Normally, the slide K occupies the position shown in Figure 2, wherein it will be noted that the front end portion R of said slide is positioned under the hopper 50 and the rear end of the nut blank receiving slot in said slide is positioned some distance to the rear of the stop 54 on the supporting plate 51. The nut blank which is to be threaded on the next downward stroke of the spindle B is positioned in the slot in the slide K in vertical alignment with the tap C and the nut blank which is to be threaded at the succeeding operation is also positioned in said slot in front of the operative nut blank, the lowermost nut blank in the hopper resting upon the front end portion R of the slide. During the downward stroke of the spindle B the member 26 engages the stop 60 on the rod 58, and thus moves the rod 58 in a direction to cause the slide K to move forwardly, thereby permitting the lowermost nut blank in the hopper to drop downwardly into the front end of the slot in the slide when said slide reaches the end of its forward stroke. At the completion of the threading operation the spindle B moves upwardly, and when the member 26 strikes against the stop 59 on the rod 58 said rod receives a quick upward stroke which causes the slide K to move rearwardly back to its former position, thus causing the next nut blank to be brought into operative position in engagement with the stop 54, it being understood that the nut blank through which the tap C passed during the previous downward stroke of the spindle B remains on said tap and is thus moved upwardly by same during the upward stroke of the spindle. Thereafter, the slide K remains in the position shown in Figure 2 until it is again shifted forwardly during the downward stroke of the spindle B. From the foregoing it will be understood that the action of the slide K is to move forwardly at the time the tap C is passing downwardly through the nut blank that bears against the stop 54, the lowermost nut blank in the hopper 50 dropping into the front end portion of the slot in said slide when said slide reaches its extreme forward position, and then move rearwardly after the nut blank which has just been tapped is withdrawn from the slot in the slide by the upward movement of the spindle B. One desirable characteristic of a nut blank feeding mechanism of the construction above described is that it removes the nut blanks from the supply hopper in such a manner that there is no liability of the nut blanks canting or assuming such a position that they will jam against the lower end of the hopper when the slide K reciprocates. This is due to the fact that the lowermost nut blank in the hopper is discharged from the hopper progressively, or by two separate and distinct steps, instead of in a single step. I obtain this action by making the slide K, or, at least, the front end portion of said slide, approximately one-half the thickness of a nut blank, so that when said slide is moved rearwardly from the position shown in Figure 3 into the position shown in Figure 2 the lowermost nut blank in the hopper will drop downwardly a distance approximately one-half the depth or thickness of the nut blank. On the succeeding forward stroke of the slide said lowermost nut blank will move downwardly approximately the same distance when the front end portion of the slide passes from underneath the lowermost nut blank.

While I prefer to use a mechanism of the character shown in Figures 1 to 5 for feeding the nut blanks from the supply hopper into position to be acted upon by the tap on the spindle, my broad idea is not limited to such a mechanism, for various other means could be used for this purpose without departing from the spirit of my invention. For example, the nut blank feeding mechanism may consist of a reciprocating element such as a rod 70 that is moved in one direction by a piston 71 arranged in a cylinder 72 and in the opposite direction by a spring 73 and provided with a pivotally mounted nut blank feeding device 74 that reciprocates in a slot 75 in the supporting plate 51 of the machine when the rod 70 moves forwardly and rearwardly, as shown in Figure 6. The cylinder 72 is arranged on the underside of the supporting plate 51 and is connected by means of a pipe 76 with the exhaust port of the casing I of the controlling valve previously referred to. When said controlling valve is moved at the end of the upward stroke of the spindle B to exhaust the operating medium from the cylinder G, said escaping operating medium passes by way of the pipe 76 to the cylinder 72, and thus causes the piston 71 in said cylinder to move to the right, looking at Figure 6, thus causing the feeding device 74 to remove the lowermost nut blank from the hopper 50 and the nut blank which is next to be operated upon into engagement with the stationary stop 54, it, of course, being understood that the upward stroke of the spindle B causes the finished nut to be moved upwardly off the supporting plate 51. When the piston 71 in the cylinder 72 reaches a certain point, the operating medium in said cylinder escapes through exhaust ports 77, thereby permitting the spring 73 to restore the rod 70 and the feeding device 74 thereon to the position shown in full lines in Figure 6. The feeding device 74 is preferably pivotally connected to the rod 70 and the lower end portion of same is counterweighted so that it will normally bear against the stop 78 on the rod 70, and thus cause the feeding device 74 to normally remain in an upright position.

A nut tapping machine of the construction above described, after being set in operation, will automatically feed nut blanks into position to be operated upon and it will tap a number of nut blanks and then automatically cease operating. Accordingly, one operator can take care of a number of machines or a gang machine provided with a large number of spindles. The nut blank feeding mechanism of the machine, in addition to being automatic in its operation, is of such design that nut blanks will be fed progressively from the supply hopper into alignment with the tap on the spindle of the machine, and moreover, will be removed from the hopper in such a manner that there is little liability of their becoming jammed, even when the machine is being used for threading nut blanks of a relatively great thickness or depth.

Having thus described my invention, what I claim as new and desire to secure by Letters Patent is:

1. A nut tapping machine provided with a spindle that moves downwardly by gravity, a tap carried by said spindle, a fluid operated means for automatically raising said spindle at the completion of the nut tapping operation, and means for automatically feeding a nut blank from a source of supply into position to be acted upon by the tap carried by the spindle of the machine.

2. A nut tapping machine provided with a reciprocating spindle equipped with a tap that is adapted to pass through a nut blank when the spindle moves in one direction, a fluid operated means for moving the spindle and the tapped nut blank on the tap in the opposite direction, and means for automatically feeding a nut blank into the position formerly occupied by the tapped nut blank when the spindle is being moved by said fluid operated means.

3. A nut tapping machine provided with a reciprocating spindle equipped with a tap or threading device, a fluid operated means for automatically restoring said spindle at the completion of the nut tapping operation, and means directly connected with and operated positively by the movement of the spindle for feeding a nut blank into position to be acted upon by the tap on the spindle at the next cycle of the machine.

4. A nut tapping machine provided with a reciprocating spindle equipped with a tap or threading device, a fluid operated means for automatically restoring said spindle at the completion of the nut tapping operation, means for causing said spindle to come to rest after it has made a number of cycles, and an automatically operating means combined with and operated by said spindle for feeding a nut blank into position to be acted upon by the tap on said spindle at each cycle of the spindle.

5. A nut tapping machine provided with a fluid operated reciprocating spindle equipped with a tap or threading device that is adapted to pass through a nut blank when said spindle moves in one direction, a nut blank feeding device, and means operated by the movement of said spindle in one direction for positively actuating said feeding device and moving it into a position to receive a nut blank and operated by the movement of said spindle in the opposite direction for positively actuating said feeding device and causing it to arrange a nut blank in position to be acted upon by said tap at the next cycle of the spindle.

6. A nut blank feeding mechanism for nut tapping machines, comprising a hopper for holding nut blanks, and a feeding device arranged under said hopper and so constructed that it will permit the lowermost nut blank in the hopper to partially escape from the hopper when said device is in one position and to completely escape from the hopper when said device is in a different position.

7. A nut blank feeding mechanism for nut tapping machines, comprising a hopper for holding nut blanks, and a feeding device combined with said hopper in such a manner that it causes the lowermost nut blank in the hopper to escape from the discharge opening of the hopper, first partially, then completely, and finally be conveyed away from the hopper.

8. A nut blank feeding mechanism for nut tapping machines, comprising a hopper for holding nut blanks, a supporting surface arranged under said hopper, and a nut blank feeding device constructed in such a manner that when it is arranged in one position it will permit the lowermost nut blank in the hopper to partially escape from the hopper and rest upon said device and when arranged in a different position will cause said lowermost nut blank to drop onto said supporting surface into position to be fed away from the hopper when said feeding device is restored to its former position.

9. A nut blank feeding mechanism for nut tapping machines, comprising a hopper for holding nut blanks, and a movable feeding device arranged under said hopper and provided with a portion on which the lowermost nut blank in the hopper rests when said device is in one position, and having a slot or opening that receives said lowermost nut blank when said device is moved into a different position.

10. A nut blank feeding mechanism for nut tapping machines, comprising a hopper for holding nut blanks, a supporting plate arranged under said hopper, a stop or abutment on said plate that determines the position of the blank to be tapped, and a reciprocating slide on said plate arranged under said hopper and provided with a slot of sufficient dimensions to receive said stop and a plurality of nut blanks.

11. A nut blank feeding mechanism for nut tapping machines, comprising a hopper for holding nut blanks, a supporting plate arranged under said hopper, a stop or abutment on said plate that determines the position of the blank to be tapped, and a reciprocating slide on said plate arranged under said hopper and provided with a slot of sufficient dimensions to receive said stop and a plurality of nut blanks, one portion of said slide being of such thickness that when said slide is in one position the lowermost nut blank in the hopper will partially escape from the hopper and rest on said portion.

12. A nut tapping machine, comprising a vertically-reciprocating spindle equipped with a tap or threading device, a cylinder provided with a piston that is operatively connected to said spindle, means for admitting an operating medium to said cylinder so as to automatically raise said spindle at the completion of the threading operation, a hopper for holding a plurality of nut blanks, a reciprocating slide for removing nut blanks from the lower end of said hopper and feeding said blanks into position to be acted upon by the tap on said spindle, and an operating mechanism for said slide that causes said slide to move in one direction during the downward stroke of the spindle and in the opposite direction during the return stroke of the spindle.

SAMUEL B. CLAY.